(12) United States Patent
Wambugu Ngahu

(10) Patent No.: US 10,910,865 B2
(45) Date of Patent: Feb. 2, 2021

(54) POWER TRANSMISSION COMMUNICATION UNIT

(71) Applicant: Yazaki Corporation, Tokyo (JP)

(72) Inventor: Antony Wambugu Ngahu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/394,499

(22) Filed: Apr. 25, 2019

(65) Prior Publication Data
US 2019/0334368 A1 Oct. 31, 2019

(30) Foreign Application Priority Data
Apr. 27, 2018 (JP) .................. 2018-086552

(51) Int. Cl.
*H02J 7/02* (2016.01)
*H02J 50/12* (2016.01)
*H04B 5/00* (2006.01)

(52) U.S. Cl.
CPC .............. *H02J 7/025* (2013.01); *H02J 50/12* (2016.02); *H04B 5/0037* (2013.01); *H04B 5/0081* (2013.01)

(58) Field of Classification Search
CPC . H01F 38/14; H02J 50/12; H02J 5/005; H02J 50/005; H02J 50/80; H01R 13/6633; H04B 5/0037
See application file for complete search history.

(56) References Cited

U.S. PATENT DOCUMENTS

| 2012/0175969 | A1* | 7/2012 | Maughan ................ H01F 38/14 307/104 |
| 2015/0364931 | A1* | 12/2015 | Ren ........................ H02J 50/10 307/104 |
| 2017/0149268 | A1 | 5/2017 | Yajima et al. |
| 2018/0102211 | A1 | 4/2018 | Hanabusa et al. |
| 2018/0102213 | A1* | 4/2018 | Hanabusa ............. H01F 27/306 |

FOREIGN PATENT DOCUMENTS

| EP | 2688078 A1 | 1/2014 |
| JP | 2017-099115 A | 6/2017 |
| WO | 2017/109799 A1 | 6/2017 |

* cited by examiner

*Primary Examiner* — Carlos Amaya
(74) *Attorney, Agent, or Firm* — Sughrue Mion, PLLC

(57) ABSTRACT

A power transmission communication unit includes a first unit including a first power transmission coil, a first signal transmission coil, and a first case, and a second unit including a second power transmission coil, a second signal transmission coil, and a second case. The first unit and the second unit have a positional relation such that the first power transmission coil and the second power transmission coil face each other along a first coupling axis direction, and the first signal transmission coil and the second signal transmission coil face each other along a second coupling axis direction different from the first coupling axis direction, in a state in which the first case and the second case are fitted to each other.

10 Claims, 7 Drawing Sheets

FIG.7

| | COMPAR-ATIVE EXAMPLE | EXAMPLE 1 | EXAMPLE 2 | EXAMPLE 3 | EXAMPLE 4 |
|---|---|---|---|---|---|
| FIRST POWER/ FIRST SIGNAL [K(QpNp)] | 0.239 | 0.142 | 0.099 | 0.091 | 0.011 |
| FIRST POWER/ SECOND SIGNAL [K(QpNs)] | 0.231 | 0.172 | 0.091 | 0.084 | 0.008 |
| SECOND POWER/ FIRST SIGNAL [K(QspNp)] | 0.228 | 0.147 | 0.100 | 0.091 | 0.011 |
| SECOND POWER/ SECOND SIGNAL [K(QsNs)] | 0.235 | 0.182 | 0.093 | 0.085 | 0.009 |
| FIRST POWER/ SECOND SIGNAL [K(Q)] | 0.663 | 0.663 | 0.692 | 0.695 | 0.671 |

FIG.8

| | WIRELESS COMMUNICATION | WIRELESS POWER | COMMUNICATION ESTABLISHED |
|---|---|---|---|
| EXAMPLE 1 | ON | OFF | ○ |
| | OFF | ON | — |
| | ON | ON | △ |
| EXAMPLE 2 | ON | OFF | ○ |
| | OFF | ON | — |
| | ON | ON | ○ |

POWER TRANSMISSION COMMUNICATION UNIT

CROSS-REFERENCE TO RELATED APPLICATION(S)

The present application claims priority to and incorporates by reference the entire contents of Japanese Patent Application No. 2018-086552 filed in Japan on Apr. 27, 2018.

BACKGROUND OF THE INVENTION

1. Field of the Invention

The present invention relates to a power transmission communication unit.

2. Description of the Related Art

As a conventional power transmission communication unit, for example, Japanese Patent Application Laid-open No. 2017-099115 discloses a communication device including a substrate, a magnetic sheet, a coil for noncontact charging, and a coil for near field magnetic induction. The magnetic sheet is disposed on a first surface of the substrate. The coil for noncontact charging is disposed on the magnetic sheet. The coil for near field magnetic induction is disposed on a second surface of the substrate. In this configuration, the communication device has the function of charging a battery by transmitting power in a contactless manner (contactless charging) and the near-field wireless communication function.

The communication device described in Japanese Patent Application Laid-open No. 2017-099115 above has a room for further improvement, for example, in compatibility between contactless power transmission and contactless signal transmission.

SUMMARY OF THE INVENTION

The present invention is made in view of the situation above, and an object of the present invention is to provide a power transmission communication unit that can appropriately achieve both contactless power transmission and contactless signal transmission.

In order to achieve the above mentioned object, a power transmission communication unit according to one aspect of the present invention includes a first unit including a first power transmission coil capable of transmitting electric power in a contactless manner, a first signal transmission coil capable of transmitting a signal in a contactless manner, and a first case that is provided with the first power transmission coil and the first signal transmission coil; and a second unit including a second power transmission coil capable of transmitting electric power to and from the first power transmission coil in a contactless manner, a second signal transmission coil capable of transmitting a signal to and from the first signal transmission coil in a contactless manner, and a second case that is provided with the second power transmission coil and the second signal transmission coil and capable of being fitted to the first case, wherein the first unit and the second unit have a positional relation such that the first power transmission coil and the second power transmission coil face each other along a first coupling axis direction, and the first signal transmission coil and the second signal transmission coil face each other along a second coupling axis direction different from the first coupling axis direction, in a state in which the first case and the second case are fitted to each other.

According to another aspect of the present invention, in the power transmission communication unit, it is preferable that the first coupling axis direction extends along a fitting direction of the first case and the second case, and the second coupling axis direction is orthogonal to the first coupling axis direction.

According to still another aspect of the present invention, in the power transmission communication unit, it is preferable that in a state in which the first case and the second case are fitted to each other, both of surfaces of the first case and the second case that face each other along the first coupling axis direction extend along a direction intersecting the first coupling axis direction, and both of surfaces of the first case and the second case that face each other along the second coupling axis direction extend along a direction intersecting the second coupling axis direction.

According to still another aspect of the present invention, in the power transmission communication unit, it is preferable that the first case has a fitting concave portion configured to receive the second case, the first power transmission coil and the second power transmission coil face each other along the first coupling axis direction with a bottom portion of the fitting concave portion interposed therebetween, and the first signal transmission coil and the second signal transmission coil face each other along the second coupling axis direction with a side portion of the fitting concave portion interposed therebetween, and the second signal transmission coil is positioned inside with respect to the first signal transmission coil in the second coupling axis direction.

According to still another aspect of the present invention, in the power transmission communication unit, it is preferable that the first unit includes a first magnetic substance in the first case, the first magnetic substance being positioned on an opposite side to the first signal transmission coil with the first power transmission coil interposed therebetween in a fitting direction of the first case and the second case, the second unit includes a second magnetic substance in the second case, the second magnetic substance being positioned between the second power transmission coil and the second signal transmission coil in the fitting direction, and the second magnetic substance is larger than the second power transmission coil in a direction orthogonal to the fitting direction.

According to still another aspect of the present invention, in the power transmission communication unit, it is preferable that the second magnetic substance has an end portion in a direction orthogonal to the fitting direction, the end portion being bent toward the second power transmission coil in the fitting direction.

According to still another aspect of the present invention, in the power transmission communication unit, it is preferable that the first unit includes a first metal shield member surrounding the first power transmission coil and the first magnetic substance in a direction orthogonal to the fitting direction, and the second unit includes a second metal shield member surrounding the second power transmission coil and the second magnetic substance in a direction orthogonal to the fitting direction.

The above and other objects, features, advantages and technical and industrial significance of this invention will be better understood by reading the following detailed descrip-

BRIEF DESCRIPTION OF THE DRAWINGS

FIG. 7 is a diagram illustrating the simulation results for power transmission communication units according to embodiments; and FIG. 8 is a diagram illustrating the simulation results for power transmission communication units according to embodiments.

DETAILED DESCRIPTION OF THE PREFERRED EMBODIMENTS

Figure 2:
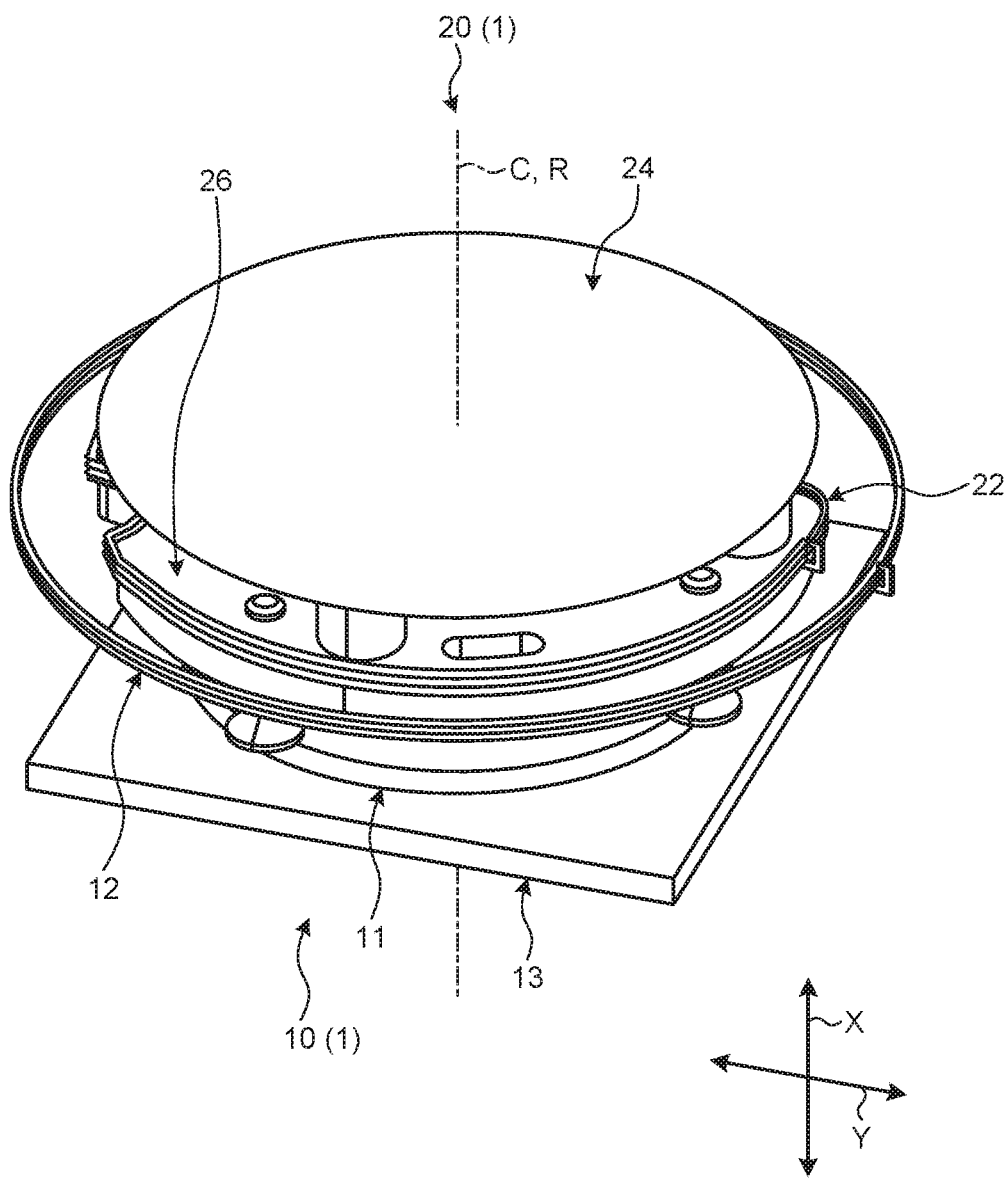
FIG. 2 is a schematic perspective view illustrating an outline configuration of the power transmission communication unit according to the first embodiment.

Embodiments according to the present invention will be described in detail below with reference to the drawings. The present invention is not limited by the embodiments. The components in the following embodiments include those readily replaceable by those skilled in the art or those substantially identical. FIG. 2 illustrates some of the components of a power transmission communication unit in a simplified manner.

First Embodiment

Figure 1:
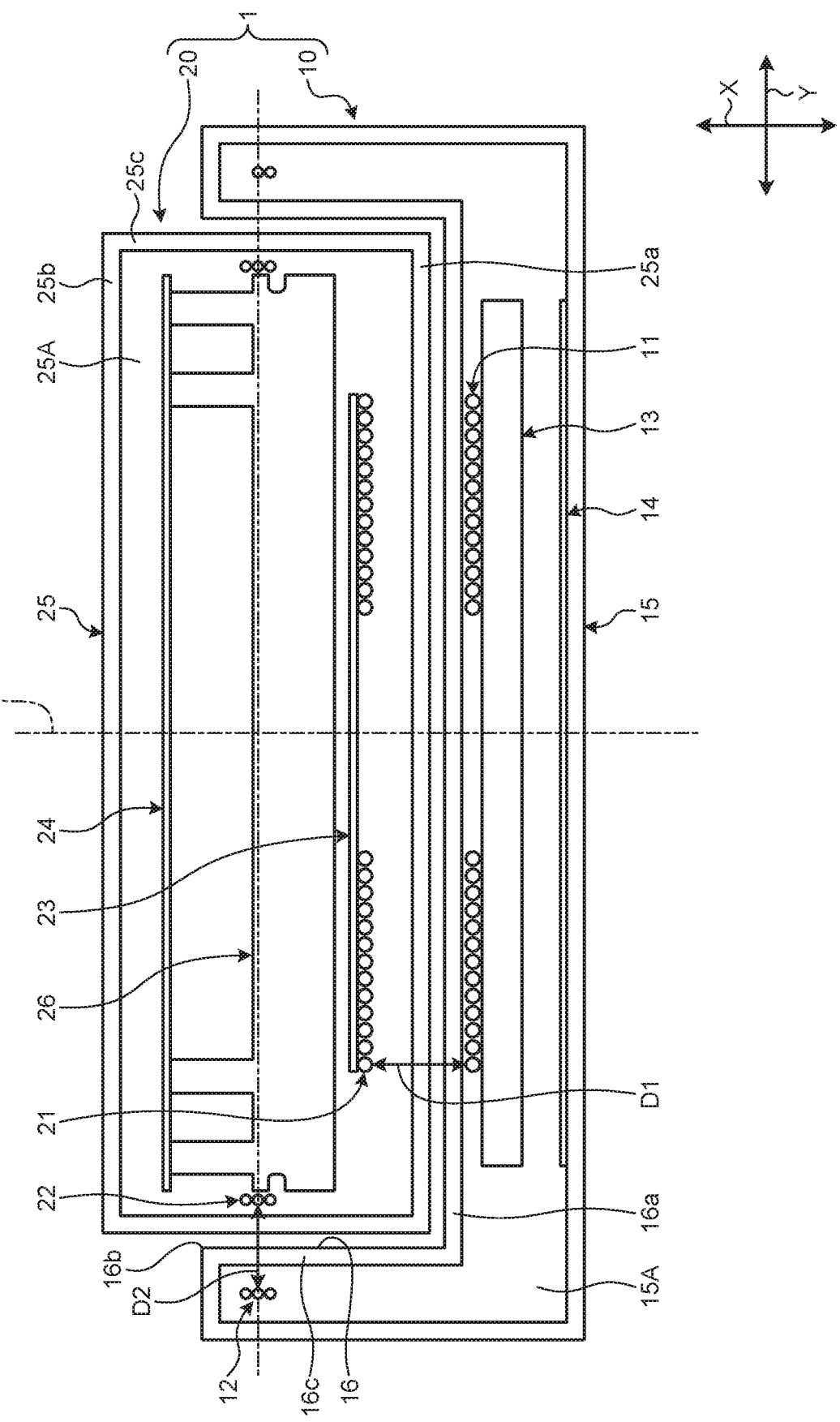
FIG. 1 is a schematic cross-sectional view illustrating an outline configuration of a power transmission communication unit according to a first embodiment.

A power transmission communication unit 1 in the present embodiment illustrated in FIG. 1 and FIG. 2 is a wireless power transfer system that provides contactless power transmission by wirelessly transmitting at least part of electric power from a power source to a variety of electrical loads. The power transmission communication unit 1 in the present embodiment transmits both of electric power and a signal in a contactless manner between a power source-side device and an electrical load-side device. In the following, the configuration of the power transmission communication unit 1 will be described in detail with reference to the drawings.

Specifically, the power transmission communication unit 1 in the present embodiment includes a first unit 10 and a second unit 20. These two units are paired to configure a wireless power transfer system. In the power transmission communication unit 1, one of a pair of the first unit 10 and the second unit 20 forms a power transmitting unit and the other of a pair of the first unit 10 and the second unit 20 forms a power receiving unit. In the power transmission communication unit 1 in the present embodiment, the first unit 10 forms a power transmitting unit that transmits electric power from a power source to a power receiving unit in a contactless manner, and the second unit 20 forms a power receiving unit that receives electric power transmitted from the power transmitting unit in a contactless manner.

The first unit 10 corresponds to the above power source-side device and corresponds to a unit that supplies electric power to the above electrical load-side device. The first unit 10 is connected to, for example, a power source such as battery and electric generator, a power supply-distributing function component for distributing electric power from the power source to each part, and a device (which may be referred to as master device) such as a control function component for controlling electric power supply and signal communication, through wiring such as power supply line, ground line, and communication line. The second unit 20 corresponds to the above electrical load-side device and corresponds to a unit that is supplied with electric power from the above power source-side device. The second unit 20 is connected to, for example, a variety of devices (which may be referred to as slave device) driven by electric power from the power source through wiring such as power supply line, ground line, and communication line. Here, the power supply line is wiring for transmitting electric power for driving each part. The ground line is wiring for earthing (grounding). The communication line is wiring for transmitting a variety of communication signals.

More specifically, the first unit 10 includes a first power transmission coil 11, a first signal transmission coil 12, a first magnetic substance 13, a substrate 14, and a first case 15. The second unit 20 includes a second power transmission coil 21, a second signal transmission coil 22, a second magnetic substance 23, a substrate 24, and a second case 25.

The first power transmission coil 11 is a conductor coil capable of transmitting electric power to and from the second power transmission coil 21 in a contactless manner. The second power transmission coil 21 is a conductor coil capable of transmitting electric power to and from the first power transmission coil 11 in a contactless manner. That is, the first power transmission coil 11 and the second power transmission coil 21 can mutually transmit electric power in a contactless manner. The first power transmission coil 11 and the second power transmission coil 21 may be formed, for example, with spiral conductor coils or may be formed with solenoid (helical) conductor coils. The spiral conductor coil is formed with a conductive wire wound about a center axis in a spiral shape around the center axis. The solenoid conductor coil is formed with a conductive wire wound about a center axis in a helical shape around the center axis. Here, the first power transmission coil 11 and the second power transmission coil 21 are formed with, for example, spiral conductor coils wound around a center axis C in a spiral shape. The first power transmission coil 11 and the second power transmission coil 21, facing each other, can transmit electric power in a contactless manner by various methods such as electromagnetic induction and electromagnetic resonance. One of the first power transmission coil 11 and the second power transmission coil 21 serves as a transmitter coil to transmit electric power, and the other serves as a receiver coil to receive electric power. Here, of the first power transmission coil 11 and the second power transmission coil 21, typically, the first power transmission coil 11 that is the power transmitting unit-side coil is a power transmitter coil, and the second power transmission coil 21 that is the power receiving unit-side coil is a power receiver coil.

The first signal transmission coil 12 is a conductor coil capable of transmitting a signal to and from the second signal transmission coil 22 in a contactless manner. The second signal transmission coil 22 is a conductor coil capable of transmitting a signal to and from the first signal transmission coil 12 in a contactless manner. That is, the first signal transmission coil 12 and the second signal transmission coil 22 can mutually transmit a signal in a contactless manner (wireless communication). The first signal transmission coil 12 and the second signal transmission coil 22 may be formed, for example, with spiral conductor coils or may be formed with solenoid conductor coils. Here, the first signal transmission coil 12 and the second signal transmission coil 22 are formed, for example, with solenoid conductor coils wound around the center axis C in a helical shape. The first signal transmission coil 12 and the second signal transmission coil 22 form communication antennas to emit (transmit) high frequency energy as electromagnetic waves (radio waves) and mutually convert (receive) electromagnetic waves (radio waves) in space into high frequency energy. The first signal transmission coil 12 and the second signal transmission coil 22, facing each other, can transmit a signal in a contactless manner by a variety of methods. One of the first signal transmission coil 12 and the second signal transmission coil 22 serves as a transmitter antenna to transmit a signal, and the other serves as a receiver antenna to receive a signal.

The first magnetic substance 13 and the second magnetic substance 23 allow the magnetic flux produced by the first power transmission coil 11 and the second power transmission coil 21 to pass through to enhance the coupling between the first power transmission coil 11 and the second power transmission coil 21 that are opposed to each other. The first magnetic substance 13 and the second magnetic substance 23 also have the function of preventing or reducing the magnetic flux from the first power transmission coil 11 and the second power transmission coil 21 from reaching the first signal transmission coil 12, the second signal transmission coil 22, and the substrates 14 and 24 described below, and the like. The first magnetic substance 13 and the second magnetic substance 23 are formed, for example, by sintering a mixture of iron oxide as a base and a metal material such as cobalt, nickel, and manganese. The first magnetic substance 13 and the second magnetic substance 23 are formed, for example, in a circular shape. The first magnetic substance 13 is provided adjacent to the first power transmission coil 11. The second magnetic substance 23 is provided adjacent to the second power transmission coil 21.

The substrate 14 is mounted with devices (electronic components) having a variety of functions to configure an electronic circuit for implementing a variety of functions of the first unit 10. The substrate 14 is electrically connected to the first power transmission coil 11, the first signal transmission coil 12, and wiring such as power supply line, ground line, and communication line. Similarly, the substrate 24 is mounted with devices (electronic components) having a variety of functions to configure an electronic circuit for implementing a variety of functions of the second unit 20. The substrate 24 is electrically connected to the second power transmission coil 21, the second signal transmission coil 22, and wiring such as power supply line, ground line, and communication line. The substrates 14 and 24 are formed with, for example, a printed circuit board (PCB) or a bus bar plate substrate in which a bus bar serving as a circuit made of a conductive metal material is covered with an insulating resin material to form a board. In the first unit 10, power transmission through the first power transmission coil 11 and signal transmission through the first signal transmission coil 12 are controlled by the electronic circuit of the substrate 14. In the second unit 20, power transmission through the second power transmission coil 21 and signal transmission through the second signal transmission coil 22 are controlled by the electronic circuit of the substrate 24.

The parts of the first unit 10 and the second unit 20 are assembled in the first case 15 and the second case 25, respectively. The first case 15 is a first housing provided with the first power transmission coil 11, the first signal transmission coil 12, the first magnetic substance 13, and the substrate 14. The second case 25 is a second housing provided with the second power transmission coil 21, the second signal transmission coil 22, the second magnetic substance 23, and the substrate 24. The first case 15 and the second case 25 are formed of, for example, an insulating resin material. The electronic circuit formed with the substrate 14 and the electronic circuit formed with the substrate 24 may be partially provided outside the first case 15 and the second case 25.

The first case 15 and the second case 25 in the present embodiment are configured to be fitted to each other. The first unit 10 and the second unit 20 in the present embodiment are configured to have a positional relation such that the first power transmission coil 11 and the second power transmission coil 21 face each other and the first signal transmission coil 12 and the second signal transmission coil 22 face each other, in a state in which the first case 15 and the second case 25 are fitted to each other.

Specifically, one of the first case 15 and the second case 25 has a fitting concave portion 16, and the other of the first case 15 and the second case 25 is formed so as to be fitted in the fitting concave portion 16. The fitting concave portion 16 in the present embodiment is provided in the first case 15, and the second case 25 is formed to be able to fit the fitting concave portion 16.

More specifically, the first case 15 is formed in a box shape having a storage space 15A in the inside. The first case 15 stores the first power transmission coil 11, the first signal transmission coil 12, the first magnetic substance 13, and the substrate 14 in the storage space 15A. The first power transmission coil 11, the first signal transmission coil 12, the first magnetic substance 13, and the substrate 14 are positioned and held in the storage space 15A, for example, with a holding member. The first power transmission coil 11, the first signal transmission coil 12, the first magnetic substance 13, and the substrate 14 may be fixed to the corresponding portions, for example, with an adhesive. The first case 15 has the fitting concave portion 16 formed in a concave shape on the outer surface of the box shape. The fitting concave portion 16 is formed as a cylindrical space about the center axis C. In other words, the first case 15 has the fitting concave portion 16 formed in a cylindrical concave shape on the outer surface of the box shape. The fitting concave portion 16 is a space in which the second case 25 can be fitted.

Here, typically, the center axis C is substantially identical to the center axis C of the first power transmission coil 11, the first signal transmission coil 12, the second power transmission coil 21, and the second signal transmission coil 22 described above. The fitting direction of the first case 15 and the second case 25 is the direction along this center axis C. In the following description, the direction along the center axis C may be referred to as "axial direction X", and the direction orthogonal to the axial direction X may be referred to as "radial direction Y". The fitting direction corresponds to the axial direction X.

The first power transmission coil 11 is positioned in the storage space 15A to face a bottom portion 16a of the fitting concave portion 16 along the axial direction X. The bottom portion 16a is an end surface (bottom surface) of the recess on one side in the axial direction X of the fitting concave portion 16 and is a surface facing an opening 16b through which the second case 25 is inserted along the axial direction X. The first signal transmission coil 12 is positioned on the outside in the radial direction Y of a side portion 16c of the fitting concave portion 16 so as to be wound on the outer peripheral surface of the side portion 16c, in the storage space 15A. The side portion 16c is a surface along the axial direction X of the fitting concave portion 16 and is a portion that forms a curved surface of a cylindrical shape. The first magnetic substance 13 is positioned adjacent to the first power transmission coil 11 on one side of the first power transmission coil 11 in the axial direction X, or in this example, on the opposite side to the first signal transmission coil 12, in the storage space 15A. In other words, the first magnetic substance 13 is positioned on the opposite side to the first signal transmission coil 12 with the first power transmission coil 11 interposed therebetween in the axial direction X, in the storage space 15A. The first magnetic substance 13 is positioned such that its thickness direction is the axial direction X. Here, the first magnetic substance 13 is formed so as to be larger than the first power transmission coil 11 in the radial direction Y. The substrate 14 is positioned at a distance from the first magnetic substance 13 on one side of the first magnetic substance 13 in the axial direction X, or in this example, on the opposite side to the first power transmission coil 11, in the storage space 15A. In other words, the substrate 14 is positioned on the opposite side to the first power transmission coil 11 with the first magnetic substance 13 interposed therebetween in the axial direction X, in the storage space 15A. That is, the first magnetic substance 13 is positioned between the first power transmission coil 11 and the substrate 14 in the axial direction X. As described above, in the first unit 10, the substrate 14, the first magnetic substance 13, the first power transmission coil 11, and the first signal transmission coil 12 are arranged in this order from one side to the other side along the axial direction X in the storage space 15A, and the parts are positioned coaxially about the center axis C.

The second case 25 is formed in a tubular shape having a storage space 25A in the inside. The second case 25 can be fitted in the fitting concave portion 16 and is formed in a cylindrical shape about the center axis C. The second case 25 has both end portions 25a and 25b in the axial direction X to form closing end surfaces and has a side portion 25c along the axial direction X to form a curved surface of the cylindrical shape. The second case 25 stores the second power transmission coil 21, the second signal transmission coil 22, the second magnetic substance 23, and the substrate 24 in the storage space 25A. The second power transmission coil 21, the second signal transmission coil 22, the second magnetic substance 23, and the substrate 24 are positioned and held in the storage space 25A, for example, with a holding member 26. The second power transmission coil 21, the second signal transmission coil 22, the second magnetic substance 23, and the substrate 24 may be fixed to the corresponding portions, for example, with an adhesive. The second power transmission coil 21 is positioned to face the end portion 25a of the second case 25 along the axial direction X in the storage space 25A. The end portion 25a is an end portion on one side in the axial direction X of the second case 25 and is a surface facing the end portion 25b along the axial direction X. Here, the end portion 25a is an end portion on the side fitted in the fitting concave portion 16. The second signal transmission coil 22 is positioned so as to be wound inside the side portion 25c of the second case 25 in the radial direction Y and between the inner peripheral surface of the side portion 25c and the outer peripheral surface of the holding member 26, in the storage space 25A. The second magnetic substance 23 is positioned adjacent to the first power transmission coil 11 on one side of the second power transmission coil 21 in the axial direction X, or in this example, on the second signal transmission coil 22 side, in the storage space 25A. In other words, the second magnetic substance 23 is positioned between the second power transmission coil 21 and the second signal transmission coil 22 in the axial direction X, in the storage space 15A. The second magnetic substance 23 is positioned such that its thickness direction is the axial direction X. Here, the second magnetic substance 23 is formed such that its size is approximately equal to the second power transmission coil 21 in the radial direction Y. The substrate 24 is positioned at a distance from the second magnetic substance 23 on one side of the second magnetic substance 23 in the axial direction X, or in this example, on the opposite side to the second power transmission coil 21, in the storage space 25A. That is, the second magnetic substance 23 is positioned between the second power transmission coil 21 and the substrate 24 in the axial direction X. To put it another way, the substrate 24 is positioned at a distance from the second signal transmission coil 22 on the opposite side of the second magnetic substance 23 with respect to the second signal transmission coil 22 in the axial direction X, in the storage space 25A. Here, the second power transmission coil 21 and the second magnetic substance 23 are held on one side (the end portion 25a side) in the axial direction of the holding member 26. The substrate 24 is held on the other side (the end portion 25b side) in the axial direction of the holding member 26. The second signal transmission coil 22 is held so as to be wound on the outer peripheral surface of the holding member 26. As described above, in the second unit 20, the substrate 24, the holding member 26 and the second signal transmission coil 22, the second magnetic substance 23, and the second power transmission coil 21 are arranged in this order from one side to the other side along the axial direction X in the storage space 25A, and the parts are positioned coaxially about the center axis C.

In the first unit 10 and the second unit 20 configured as described above, about two-thirds of the second case 25 in the axial direction X is positioned in the fitting concave portion 16 in a state in which the fitting concave portion 16 of the first case 15 and the second case 25 are fitted to each other (hereinafter this state may be simply referred to as "fitted state"). The first unit 10 and the second unit 20 are held with the first case 15 and the second case 25 in the fitted state. In the first case 15 and the second case 25, in the fitted state, the bottom portion 16a and the end portion 25a face each other along the axial direction X, and the surface of the bottom portion 16a and the surface of the end portion 25a that face each other extend along the radial direction Y. In the first case 15 and the second case 25 in the fitted state, the side portion 16c is positioned outside and the side portion 25c is positioned inside, so that the side portion 16c and the side portion 25c face each other along the radial direction Y, and the surface of the side portion 16c and the surface of the side portion 25c that face each other extend along the axial direction X.

In the first unit 10 and the second unit 20, the positions of the first power transmission coil 11 and the second power transmission coil 21 are set such that the first power transmission coil 11 and the second power transmission coil 21 have a positional relation such that they face each other along the axial direction X in the fitted state. In the fitted state, the first power transmission coil 11 and the second power transmission coil 21 are positioned to face each other along the axial direction X with the bottom portion 16a of the fitting concave portion 16 and the end portion 25a of the second case 25 interposed therebetween. With this configuration, in the first unit 10 and the second unit 20 in power transmission, the power-transmission coupling axis direction D1 as the first coupling axis direction in which the electromagnetic field of the first power transmission coil 11 and the electromagnetic field of the second power transmission coil 21 are coupled is the direction along the axial direction X. In other words, the power-transmission coupling axis direction D1 is the direction along the center axis C, the direction along the fitting direction of the first case 15 and the second case 25.

In the first unit 10 and the second unit 20, the positions of the first signal transmission coil 12 and the second signal transmission coil 22 are set such that the first signal transmission coil 12 and the second signal transmission coil 22 have a positional relation such that they face each other along the radial direction Y in the fitted state. In the fitted state, the first signal transmission coil 12 and the second signal transmission coil 22 face each other along the radial direction Y with the side portion 16c of the fitting concave portion 16 and the side portion 25c of the second case 25 interposed therebetween, and the second signal transmission coil 22 is positioned inside the first signal transmission coil 12 in the radial direction Y. With this configuration, in the first unit 10 and the second unit 20 in signal transmission, the signal-transmission coupling axis direction D2 as the second coupling axis direction in which the electromagnetic field of the first signal transmission coil 12 and the electromagnetic field of the second signal transmission coil 22 are coupled is the direction along the radial direction Y.

The first unit 10 and the second unit 20 configured as described above have a positional relation such that the power-transmission coupling axis direction D1 and the signal-transmission coupling axis direction D2 are different directions, or in this example, orthogonal to each other. In other words, in the first unit 10 and the second unit 20, the first power transmission coil 11, the first signal transmission coil 12, the second power transmission coil 21, and the second signal transmission coil 22 are arranged such that the power-transmission coupling axis direction D1 and the signal-transmission coupling axis direction D2 are orthogonal to each other.

The first unit 10 and the second unit 20 are configured as described above, whereby, in the fitted state, the first case 15 and the second case 25 can relatively rotate around the center axis C serving as the rotation axis R while keeping the fitted state.

In the power transmission communication unit 1 described above, the first unit 10 includes the first power transmission coil 11, the first signal transmission coil 12, and the first case 15, and the second unit 20 includes the second power transmission coil 21, the second signal transmission coil 22, and the second case 25. The power transmission communication unit has a positional relation such that the first power transmission coil 11 and the second power transmission coil 21 face each other along the power-transmission coupling axis direction D1, and the first signal transmission coil 12 and the second signal transmission coil 22 face each other along the signal-transmission coupling axis direction D2, in a state in which the first case 15 and the second case 25 are fitted to each other. With this configuration, in the power transmission communication unit 1, the first power transmission coil 11 and the second power transmission coil 21 can mutually transmit electric power in a contactless manner, and the first signal transmission coil 12 and the second signal transmission coil 22 can mutually transmit a signal in a contactless manner. In this case, in the power transmission communication unit 1, the first power transmission coil 11, the first signal transmission coil 12, the second power transmission coil 21, and the second signal transmission coil 22 are provided such that the power-transmission coupling axis direction D1 and the signal-transmission coupling axis direction D2 are different directions. With this configuration, in the power transmission communication unit 1, while the coupling between the first power transmission coil 11 and the second power transmission coil 21 in power transmission and the coupling between the first signal transmission coil 12 and the second signal transmission coil 22 in signal transmission are kept at an appropriate strength, the coupling between the first power transmission coil 11/the second power transmission coil 21 and the first signal transmission coil 12/the second signal transmission coil 22 can be relatively weakened. As a result, the power transmission communication unit 1 can provide efficient power transmission and high-quality signal transmission. As described above, the power transmission communication unit 1 can appropriately achieve both contactless power transmission and contactless signal transmission.

Here, in the power transmission communication unit 1 described above, the power-transmission coupling axis direction D1 extends along the fitting direction of the first case 15 and the second case 25, and the signal-transmission coupling axis direction D2 is orthogonal to the power-transmission coupling axis direction D1. With this configuration, in the power transmission communication unit 1, while the coupling between the first power transmission coil 11 and the second power transmission coil 21 in power transmission and the coupling between the first signal transmission coil 12 and the second signal transmission coil 22 in signal transmission are kept at an appropriate strength, the coupling between the first power transmission coil 11/the second power transmission coil 21 and the first signal transmission coil 12/the second signal transmission coil 22 can be further weakened. As a result, the power transmission communication unit 1 can more appropriately achieve both contactless power transmission and contactless signal transmission.

In the power transmission communication unit 1 described above, in a state in which the first case 15 and the second case 25 are fitted to each other, both of the surfaces facing each other along the power-transmission coupling axis direction D1 extend along the signal-transmission coupling axis direction D2, and both of the surfaces facing each other along the signal-transmission coupling axis direction D2 extend along the power-transmission coupling axis direction D1. In the power transmission communication unit 1, in a configuration in which the first case 15 and the second case 25 have such a positional relation, the power-transmission coupling axis direction D1 and the signal-transmission coupling axis direction D2 intersect each other as described above. This configuration can appropriately achieve both contactless power transmission and contactless signal transmission.

In the power transmission communication unit 1 described above, the first power transmission coil 11 and the second power transmission coil 21 face each other along the power-transmission coupling axis direction D1 with the bottom portion 16a of the fitting concave portion 16 interposed therebetween. In the power transmission communication unit 1, the first signal transmission coil 12 and the second signal transmission coil 22 face each other along the signal-transmission coupling axis direction D2 with the side portion 16c of the fitting concave portion 16 interposed therebetween. In the power transmission communication unit 1, the second signal transmission coil 22 is positioned inside the first signal transmission coil 12 in the signal-transmission coupling axis direction D2. In the power transmission communication unit 1 in a configuration in which the first power transmission coil 11, the first signal transmission coil 12, the second power transmission coil 21, and the second signal transmission coil 22 have such a positional relation, the power-transmission coupling axis direction D1 and the signal-transmission coupling axis direction D2 intersect each other as described above. This configuration can appropriately achieve both contactless power transmission and contactless signal transmission.

In the power transmission communication unit 1 described above, the second unit 20 has the second magnetic substance 23 positioned between the second power transmission coil 21 and the second signal transmission coil 22 in the axial direction X (fitting direction). As a result, the power transmission communication unit 1 can reduce the effect of noise produced by power transmission between the first power transmission coil 11 and the second power transmission coil 21, in signal transmission between the first signal transmission coil 12 and the second signal transmission coil 22. Accordingly, the power transmission communication unit 1 can reliably prevent reduction in quality of signal transmission between the first signal transmission coil 12 and the second signal transmission coil 22 while appropriately performing power transmission with the first power transmission coil 11 and the second power transmission coil 21.

The power transmission communication unit 1 described above employs proximity wireless communication such as NFC with a short communication distance (for example, approximately 10 mm or shorter) in signal transmission between the first signal transmission coil 12 and the second signal transmission coil 22, thereby preventing or reducing noise emission to the outside. Taking advantage of this, the power transmission communication unit 1 can be configured, for example, such that the depth (the length along the axial direction X) of the fitting concave portion 16 of the first case 15 is sufficiently longer than the aforementioned communication distance, whereby the contents of communication via signal transmission between the first signal transmission coil 12 and the second signal transmission coil 22 is hardly intercepted from the outside. In addition, the power transmission communication unit 1 can be configured such that an electrical contact is not exposed on the outside of the first case 15 and the second case 25, so that appropriate water-proof performance can be ensured with a simple configuration.

In the power transmission communication unit 1 as described above, the first case 15 and the second case 25 in a state in which they are fitted to each other can relatively rotate around the rotation axis R along the fitting direction. With this configuration, the first unit 10 and the second unit 20 of the power transmission communication unit 1 can be easily connected to enable power and signal transmission, without fitting direction or position alignment between the first case 15 and the second case 25. That is, the power transmission communication unit 1 can achieve a configuration capable of contactless power transfer and wireless communication between the first unit 10 and the second unit 20 simply by fitting the second case 25 in the fitting concave portion 16 without fitting direction or position alignment between the first case 15 and the second case 25. As a result, the power transmission communication unit 1 can be improved in easiness of assembly. In the power transmission communication unit 1, even when the first case 15 and the second case 25 relatively rotate in a state in which the first case 15 and the second case 25 are fitted to each other and in a state in which power transmission between the first power transmission coil 11 and the second power transmission coil 21 and signal transmission between the first signal transmission coil 12 and the second signal transmission coil 22 are being performed, the power transmission and the signal transmission can be performed continuously.

Here, in the power transmission communication unit 1 described above, the first case 15 has the fitting concave portion 16 formed in a cylindrical shape having the center axis C that is the rotation axis R, and the second case 25 is formed in a cylindrical shape that can be fitted in the fitting concave portion 16 and has the center axis C that is the rotation axis R. With this configuration, the power transmission communication unit 1 can be formed in a nondirectional shape around the rotation axis R (center axis C) in the relation between the first case 15 and the second case 25. As a result, the power transmission communication unit 1 can have a configuration in which the first case 15 and the second case 25 fitted to each other can relatively rotate around the rotation axis R, thereby improving the easiness of assembly.

Second Embodiment

The power transmission communication unit according to a second embodiment differs from the first embodiment in the size of the second magnetic substance. In the following, similar components as in the foregoing embodiments are denoted by common reference signs, and the common configuration, operation, and effects will not be further elaborated (the same shall be applied below).

Figure 3:
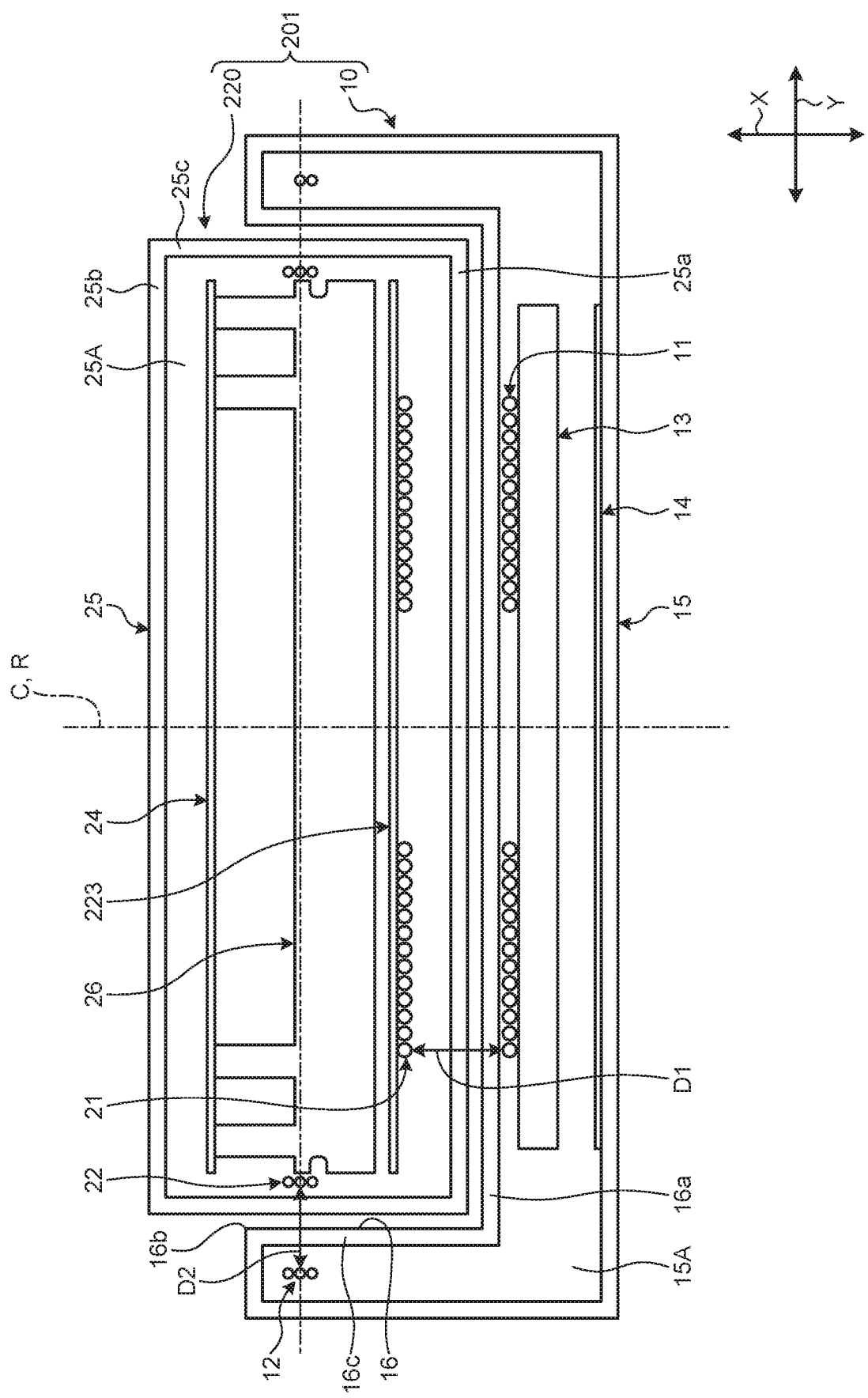
FIG. 3 is a schematic cross-sectional view illustrating an outline configuration of a power transmission communication unit according to a second embodiment.

A power transmission communication unit 201 according to the present embodiment illustrated in FIG. 3 differs from the foregoing power transmission communication unit 1 in that it includes a second unit 220 instead of the second unit 20. The other configuration of the power transmission communication unit 201 is substantially the same as the configuration of the power transmission communication unit 1. The second unit 220 in the present embodiment differs from the foregoing second unit 20 in that it includes a second magnetic substance 223 instead of the second magnetic substance 23. The other configuration of the second unit 220 is substantially the same as the configuration of the second unit 20.

The second magnetic substance 223 in the present embodiment differs from the foregoing second magnetic substance 23 in that it is formed so as to be larger than the second power transmission coil 21 in the radial direction Y. The other configuration of the second magnetic substance 223 is substantially the same as the configuration of the second magnetic substance 23.

The power transmission communication unit 201 described above can appropriately achieve both contactless power transmission and contactless signal transmission, as in the power transmission communication unit 1.

In the power transmission communication unit 1 described above, the second unit 20 has the second magnetic substance 23 positioned between the second power transmission coil 21 and the second signal transmission coil 22 in the axial direction X (fitting direction). With this configuration, the power transmission communication unit 201 can further reduce the effect of noise produced by power transmission between the first power transmission coil 11 and the second power transmission coil 21, in signal transmission between the first signal transmission coil 12 and the second signal transmission coil 22. The power transmission communication unit 201 is formed such that the second magnetic substance 223 is larger than the second power transmission coil 21 in the radial direction Y. With this configuration, in the power transmission communication unit 201, while the coupling between the first signal transmission coil 12 and the second signal transmission coil 22 in signal transmission is kept at an appropriate strength, the coupling between the first power transmission coil 11/the second power transmission coil 21 and the first signal transmission coil 12/the second signal transmission coil 22 can be further weakened. As a result, the power transmission communication unit 201 can more reliably prevent reduction in quality of signal transmission between the first signal transmission coil 12 and the second signal transmission coil 22.

Third Embodiment

The power transmission communication unit according to a third embodiment differs from the second embodiment in the shape of the second magnetic substance.

Figure 4:
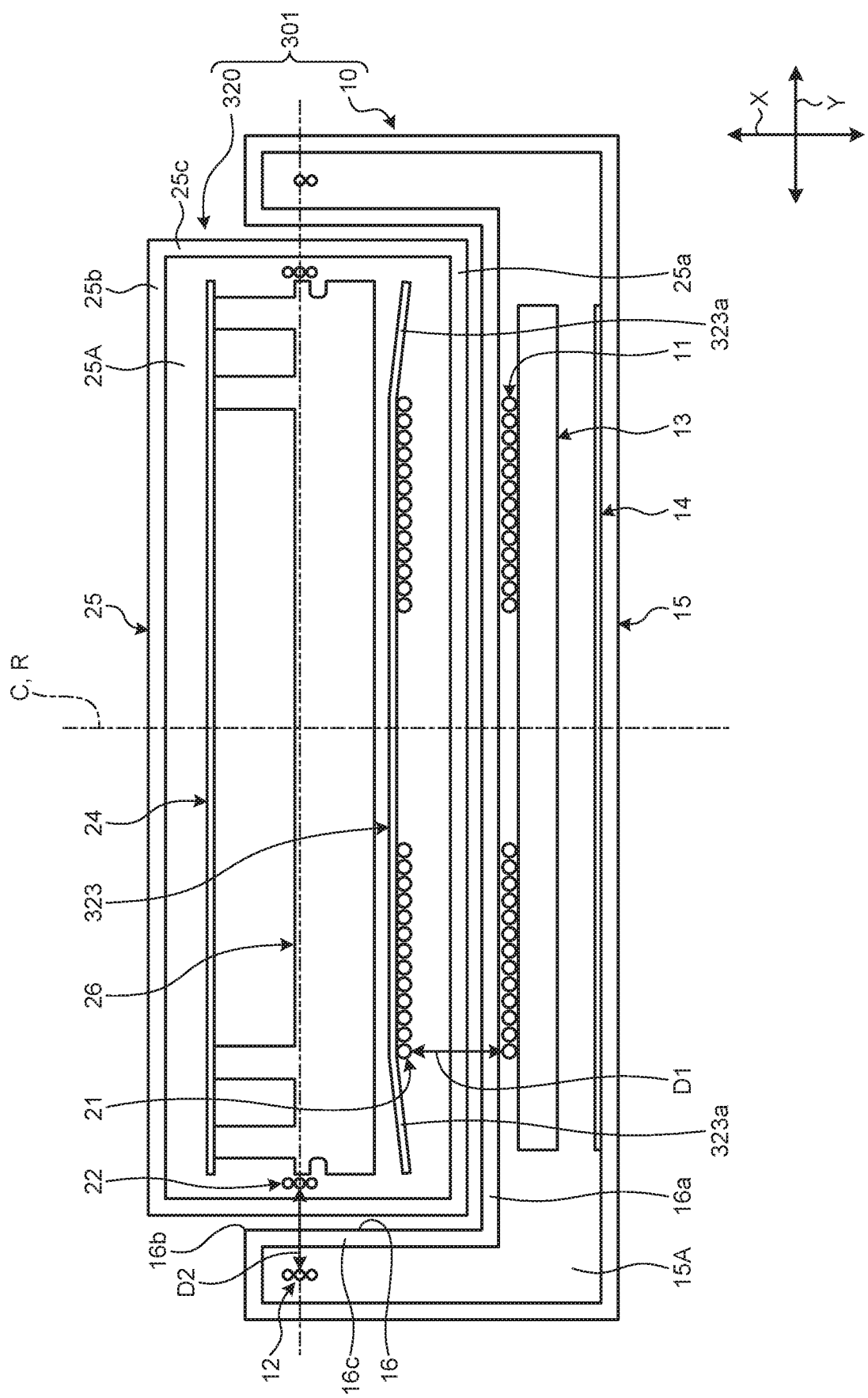
FIG. 4 is a schematic cross-sectional view illustrating an outline configuration of a power transmission communication unit according to a third embodiment.

A power transmission communication unit 301 according to the present embodiment illustrated in FIG. 4 differs from the foregoing power transmission communication unit 201 in that it includes a second unit 320 instead of the second unit 220. The other configuration of the power transmission communication unit 301 is substantially the same as the configuration of the power transmission communication unit 201. The second unit 320 in the present embodiment differs from the foregoing second unit 220 in that it includes a second magnetic substance 323 instead of the second magnetic substance 223. The other configuration of the second unit 320 is substantially the same as the configuration of the second unit 220.

The second magnetic substance 323 in the present embodiment differs from the foregoing second magnetic substance 223 in that an end portion 323a on both sides in the radial direction Y is bent toward the second power transmission coil 21 in the axial direction X. The other configuration of the second magnetic substance 323 is substantially the same as the configuration of the second magnetic substance 223. The edge of the end portion 323a of the second magnetic substance 323 is substantially flush with the end of the second power transmission coil 21 on the opposite side to the second magnetic substance 323 in the axial direction X. The end portion 323a is formed in an annular shape about the center axis C. The second magnetic substance 323 is formed in a bowl shape as a whole such that the bottom portion extends along the radial direction Y and the end portion 323a protrudes toward the second power transmission coil 21. The second power transmission coil 21 is arranged inside the bowl shape.

The power transmission communication unit 301 described above can appropriately achieve both contactless power transmission and contactless signal transmission, as in the power transmission communication units 1 and 201.

In the power transmission communication unit 301 described above, the end portion 323a in the radial direction Y of the second magnetic substance 323 is bent toward the second power transmission coil 21 in the axial direction X. With this configuration, in the power transmission communication unit 301, the line of magnetic flux of the second power transmission coil 21 in power transmission can be directed away from the first signal transmission coil 12 and the second signal transmission coil 22. As a result, in the power transmission communication unit 301, while the coupling between the first signal transmission coil 12 and the second signal transmission coil 22 in power transmission is kept at an appropriate strength, the coupling between the first power transmission coil 11/the second power transmission coil 21 and the first signal transmission coil 12/the second signal transmission coil 22 can be further weakened. Therefore, the power transmission communication unit 301 can provide more efficient power transmission and higher-quality signal transmission and can more appropriately achieve both contactless power transmission and contactless signal transmission.

Fourth Embodiment

The power transmission communication unit according to a fourth embodiment differs from the second embodiment in that it includes a metal shield member.

Figure 5:
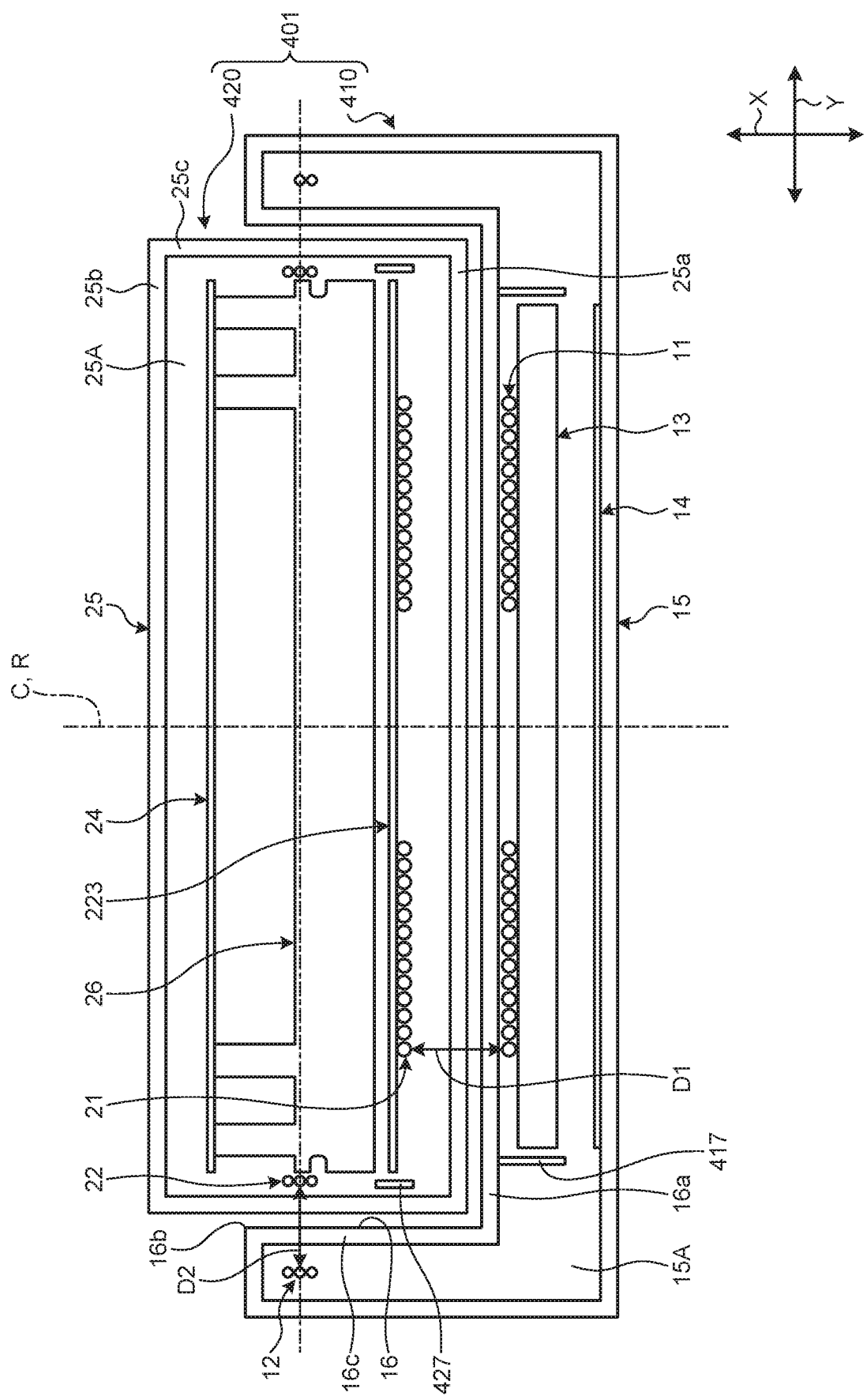
FIG. 5 is a schematic cross-sectional view illustrating an outline configuration of a power transmission communication unit according to a fourth embodiment.

A power transmission communication unit 401 according to the present embodiment illustrated in FIG. 5 differs from the foregoing power transmission communication unit 201 in that it includes a first unit 410 instead of the first unit 10 and includes a second unit 420 instead of the second unit 220. The other configuration of the power transmission communication unit 401 is substantially the same as the configuration of the power transmission communication unit 201. The first unit 410 in the present embodiment differs from the foregoing first unit 10 in that it further includes a first metal shield member 417. The other configuration of the first unit 410 is substantially the same as the configuration of the first unit 10. The second unit 420 in the present embodiment differs from the foregoing second unit 220 in that it has a second metal shield member 427. The other configuration of the second unit 420 is substantially the same as the configuration of the second unit 220.

The first metal shield member 417 and the second metal shield member 427 are formed of a metal material and block electromagnetic waves (electromagnetic force) to function as anti-noise parts. The first metal shield member 417 and the second metal shield member 427 block unnecessary electromagnetic waves, which may cause noise and the like (unnecessary electromagnetic waves), to prevent or reduce noise. The first metal shield member 417 and the second metal shield member 427 prevent intrusion of electromagnetic waves to an anti-noise target section or leakage of electromagnetic waves from an anti-noise target section. The first metal shield member 417 and the second metal shield member 427 thus block electrical noise produced by the anti-noise target section or electrical noise affecting the anti-noise target section. As a result, the first metal shield member 417 and the second metal shield member 427 can prevent or reduce emission of electrical noise from the anti-noise target section and the effect of electrical noise on the anti-noise target section.

The first metal shield member 417 in the present embodiment is provided in the storage space 15A of the first case 15 so as to surround the first power transmission coil 11 and the first magnetic substance 13 in the radial direction Y. The first metal shield member 417 is formed in an annular frame shape about the center axis C so as to surround the outside in the radial direction Y of the first power transmission coil 11 and the first magnetic substance 13. The second metal shield member 427 is provided in the storage space 25A of the second case 25 so as to surround the second power transmission coil 21 and the second magnetic substance 23 in the radial direction Y. The second metal shield member 427 is formed in an annular frame shape about the center axis C so as to surround the outside in the radial direction Y of the second power transmission coil 21 and the second magnetic substance 23. Here, both of the first metal shield member 417 and the second metal shield member 427 are formed in a cylindrical shape about the center axis C. The first power transmission coil 11 and the first magnetic substance 13 are provided inside the first metal shield member 417, and the second power transmission coil 21 and the second magnetic substance 23 are provided inside the second metal shield member 427.

The first metal shield member 417 and the second metal shield member 427 include, for example, any one of copper, aluminum, or iron. In this case, the first metal shield member 417 and the second metal shield member 427 may be formed as pure metal members made of a single metal element of copper, aluminum, or iron, or may be formed as alloy members including these metal elements. When the first metal shield member 417 and the second metal shield member 427 are formed as alloy members, for example, they may be formed as brass which is an alloy of copper and an element such as zinc, or steel or stainless steel which is an alloy of iron and an element such as carbon, chromium, and nickel.

The power transmission communication unit 401 described above can appropriately achieve both contactless power transmission and contactless signal transmission, as in the power transmission communication units 1, 201, and 301.

In the power transmission communication unit 401 described above, the first unit 410 includes the first metal shield member 417, and the second unit 420 includes the second metal shield member 427. With this configuration, the power transmission communication unit 401 can reduce radiation fields from the first power transmission coil 11 and the second power transmission coil 21 and can weaken the coupling between the first power transmission coil 11/the second power transmission coil 21 and the first signal transmission coil 12/the second signal transmission coil 22. Therefore, the power transmission communication unit 401 can provide more efficient power transmission and higher-quality signal transmission and can more appropriately achieve both contactless power transmission and contactless signal transmission.

The power transmission communication unit according to an embodiment of the present invention described above is not limited to the foregoing embodiments and is susceptible to various modifications within the scope of the claims. The power transmission communication unit according to the present embodiment may be configured by combining components of the embodiments described above and modifications thereof as appropriate.

The power transmission communication units 1, 201, 301, and 401 in the present embodiment are configured such that the first unit 10, 410 forms a power transmitting unit and the second unit 20, 220, 320, 420 forms a power receiving unit. However, the present invention is not limited to this configuration. The power transmission communication units 1, 201, 301, and 401 may be configured such that the first unit 10, 410 forms a power receiving unit and the second unit 20, 220, 320, 420 forms a power transmitting unit.

In the foregoing description, the fitting concave portion 16 is provided in the first case 15, and the second case 25 is formed so as to be fitted in the fitting concave portion 16. However, the present invention is not limited to this configuration. The fitting concave portion 16 may be provided in the second case 25, and the first case 15 may be formed so as to be fitted in the fitting concave portion 16.

In the foregoing description, the fitting concave portion 16 is formed as a cylindrical space about the center axis C, and the second case 25 can be fitted in the fitting concave portion 16 and is formed in a cylindrical shape about the center axis C. However, the present invention is not limited to this configuration. The fitting concave portion 16 may be formed in a substantially quadrangular prism shape, and the second case 25 may be formed in a substantially rectangular parallelepiped shape that can be fitted in the fitting concave portion 16, or may be formed in other shapes.

In the foregoing description, the center axis C of the fitting concave portion 16 and the second case 25 identical to the center axis C of the first power transmission coil 11, the first signal transmission coil 12, the second power transmission coil 21, and the second signal transmission coil 22. However, the center axes C may be slightly deviated from each other.

EXAMPLES

Figure 6:
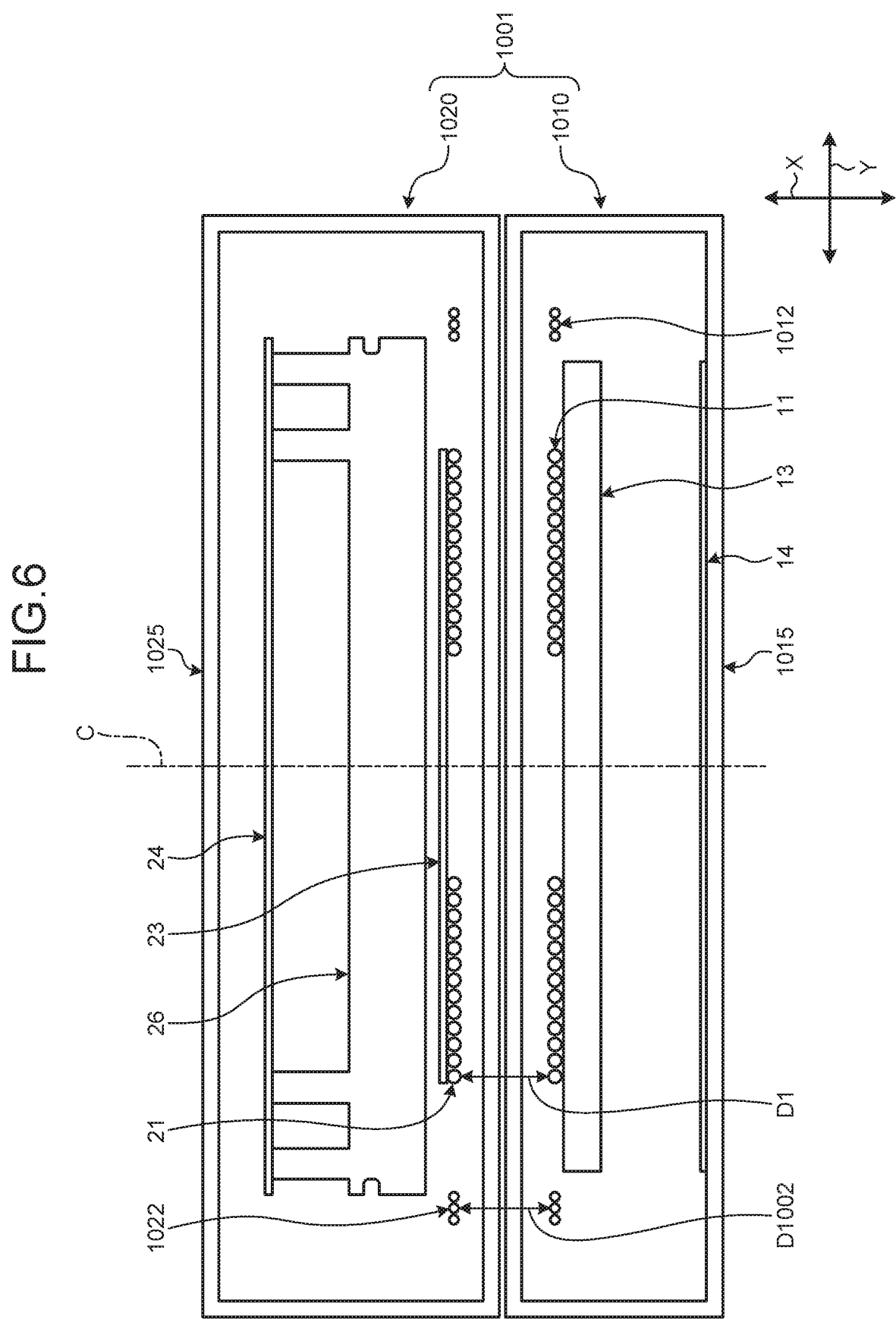
FIG. 6 is a schematic cross-sectional view illustrating an outline configuration of a power transmission communication unit according to Comparative Example.

Referring now to FIG. 6, FIG. 7, and FIG. 8, the results of simulations of power transmission and signal transmission will be now be described, in which the power transmission communication unit 1 in the first embodiment is [Example 1], the power transmission communication unit 201 in the second embodiment is [Example 2], the power transmission communication unit 301 in the third embodiment is [Example 3], and the power transmission communication unit 401 in the fourth embodiment is [Example 4]. A similar simulation was conducted for a power transmission communication unit 1001 according to Comparative Example illustrated in FIG. 6 as [Comparative Example]. This power transmission communication unit 1001 according to Comparative Example differs from the power transmission communication unit 1 in that a first case 1015 of a first unit 1010 and a second case 25 of a second unit 1020 are not fitted to each other and that a first signal transmission coil 1012 and a second signal transmission coil 1022 are arranged such that the signal-transmission coupling axis direction D2 extends along the power-transmission coupling axis direction D1 in the same direction. The other configuration of the power transmission communication unit 1001 is substantially the same as the configuration of the power transmission communication unit 1.

FIG. 7 illustrates the results of simulations of the coupling coefficient of coils in [Comparative Example], [Example 1], [Example 2], [Example 3], and [Example 4]. In FIG. 7, "K(QpNp)" represents the coupling coefficient of the first power transmission coil 11 and the first signal transmission coil 12. "K(QpNs)" represents the coupling coefficient of the first power transmission coil 11 and the second signal transmission coil 22. "K(QspNp)" represents the coupling coefficient of the second power transmission coil 21 and the first signal transmission coil 12. "K(QsNs)" represents the coupling coefficient of the second power transmission coil 21 and the second signal transmission coil 22. "K(Q)" represents the coupling coefficient of the first power transmission coil 11 and the second power transmission coil 21. "K(QpNp)", "K(QpNs)", "K(QspNp)", and "K(QsNs)" are preferably relatively small values. On the other hand, "K(Q)" is preferably a relatively large value.

As is clear from the simulation results in FIG. 7, "K(QpNp)", "K(QpNs)", "K(QspNp)", and "K(QsNs)" are relatively small values in [Example 1], [Example 2], [Example 3], and [Example 4], and "K(Q)" is a relatively large value in [Example 1], [Example 2], [Example 3], and [Example 4], compared with [Comparative Example]. "K(QpNp)", "K(QpNs)", "K(QspNp)", and "K(QsNs)" are smaller values in the order of [Example 1], [Example 2], [Example 3], and [Example 4]. FIG. B illustrates the result of comparison of communication quality between [Example 1] and [Example 2]. As illustrated in FIG. 8, it has been revealed that the effect of power transmission on communication is smaller and the communication quality is higher in [Example 2] than in [Example 1].

As described above, it is obvious that [Example 1], [Example 2], [Example 3], and [Example 4] can provide efficient power transmission and high-quality signal transmission and can appropriately achieve both contactless power transmission and contactless signal transmission.

[Example 1], for example, can reduce the material cost, compared with [Example 2], [Example 3], [Example 4], etc. [Example 2], for example, can efficiently achieve the effect with a simpler shape and thus may reduce the processing cost, compared with [Example 1], [Example 3], [Example 4], etc. [Example 3], for example, can maximize the power transmission efficiency by increasing the coupling of the first power transmission coil 11 and the second power transmission coil 21, compared with [Example 11], [Example 2], [Example 4] etc. and, at the same time, may reduce the effect on communication by power transmission. [Example 4], for example, may minimize the effect on communication with the maximum shielding effect, compared with [Example 1], [Example 2], [Example 3], etc. although the coupling between the first power transmission coil 11 and the second power transmission coil 21 and the coupling between the first signal transmission coil 12 and the second signal transmission coil 22 are relatively weak. In view of the foregoing, it is more preferable that the power transmission communication unit is formed by a selecting a combination of the configurations as appropriate, considering important factors depending on the requested applications.

The power transmission communication unit according to the present embodiment includes a first unit including a first power transmission coil, a first signal transmission coil, and a first case, and a second unit including a second power transmission coil, a second signal transmission coil, and a second case. The power transmission communication unit has a positional relation such that the first power transmission coil and the second power transmission coil face each other along a first coupling axis direction and the first signal transmission coil and the second signal transmission coil face each other along a second coupling axis direction in a state in which the first case and the second case are fitted to each other. With this configuration, in the power transmission communication unit, the first power transmission coil and the second power transmission coil can mutually transmit electric power in a contactless manner, and the first signal transmission coil and the second signal transmission coil can mutually transmit a signal in a contactless manner. In this case, in the power transmission communication unit, the first power transmission coil, the first signal transmission coil, the second power transmission coil, and the second signal transmission coil are provided such that the first coupling axis direction and the second coupling axis direction are different directions. With this configuration, the power transmission communication unit can provide efficient power transmission and high-quality signal transmission. As a result, the power transmission communication unit can achieve the effect of appropriately achieving both contactless power transmission and contactless signal transmission.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission communication unit comprising:
a first unit including a first power transmission coil capable of transmitting electric power in a contactless manner, a first signal transmission coil capable of transmitting a signal in a contactless manner, and a first case that is provided with the first power transmission coil and the first signal transmission coil; and
a second unit including a second power transmission coil capable of transmitting electric power to and from the first power transmission coil in a contactless manner, a second signal transmission coil capable of transmitting a signal to and from the first signal transmission coil in a contactless manner, and a second case that is provided with the second power transmission coil and the second signal transmission coil and capable of being fitted to the first case, wherein
the first unit and the second unit have a positional relation such that the first power transmission coil and the second power transmission coil face each other along a first coupling axis direction, and the first signal transmission coil and the second signal transmission coil face each other along a second coupling axis direction different from the first coupling axis direction, in a state in which the first case and the second case are fitted to each other,
the first case has a fitting concave portion that is formed into a cylindrical concave shape and that is configured to receive the second case,
in the state in which the first case and the second case are fitted to each other, the first power transmission coil and the second power transmission coil face each other along the first coupling axis direction with a round shaped bottom portion of the fitting concave portion interposed therebetween, and
in the state in which the first case and the second case are fitted to each other, the first signal transmission coil and the second signal transmission coil face each other along the second coupling axis direction with a side portion of the fitting concave portion, that is erected on a circumference of the round shaped bottom portion, interposed therebetween, and the first signal transmission coil and the second signal transmission coil are positioned so as to be wound along the side portion.

2. The power transmission communication unit according to claim 1, wherein
the first coupling axis direction extends along a fitting direction of the first case and the second case, and
the second coupling axis direction is orthogonal to the first coupling axis direction.

3. The power transmission communication unit according to claim 1, wherein
in a state in which the first case and the second case are fitted to each other, both of surfaces of the first case and the second case that face each other along the first coupling axis direction extend along a direction intersecting the first coupling axis direction, and both of surfaces of the first case and the second case that face each other along the second coupling axis direction extend along a direction intersecting the second coupling axis direction.

4. The power transmission communication unit according to claim 2, wherein
in a state in which the first case and the second case are fitted to each other, both of surfaces of the first case and the second case that face each other along the first coupling axis direction extend along a direction intersecting the first coupling axis direction, and both of surfaces of the first case and the second case that face each other along the second coupling axis direction extend along a direction intersecting the second coupling axis direction.

5. The power transmission communication unit according to claim 1, wherein
the first unit includes a first magnetic substance in the first case, the first magnetic substance being positioned on an opposite side to the first signal transmission coil with the first power transmission coil interposed therebetween in a fitting direction of the first case and the second case,
the second unit includes a second magnetic substance in the second case, the second magnetic substance being positioned between the second power transmission coil and the second signal transmission coil in the fitting direction, and
the second magnetic substance is larger than the second power transmission coil in a direction orthogonal to the fitting direction.

6. The power transmission communication unit according to claim 5, wherein
the second magnetic substance has an end portion in a direction orthogonal to the fitting direction, the end portion being bent toward the second power transmission coil in the fitting direction.

7. The power transmission communication unit according to claim 5, wherein
the first unit includes a first metal shield member surrounding the first power transmission coil and the first magnetic substance in a direction orthogonal to the fitting direction, and
the second unit includes a second metal shield member surrounding the second power transmission coil and the second magnetic substance in a direction orthogonal to the fitting direction.

8. The power transmission communication unit according to claim 6, wherein
the first unit includes a first metal shield member surrounding the first power transmission coil and the first magnetic substance in a direction orthogonal to the fitting direction, and
the second unit includes a second metal shield member surrounding the second power transmission coil and the second magnetic substance in a direction orthogonal to the fitting direction.

9. A power transmission communication unit comprising:
a first unit including a first power transmission coil capable of transmitting electric power in a contactless manner, a first signal transmission coil capable of transmitting a signal in a contactless manner, and a first case that is provided with the first power transmission coil and the first signal transmission coil; and
a second unit including a second power transmission coil capable of transmitting electric power to and from the first power transmission coil in a contactless manner, a second signal transmission coil capable of transmitting a signal to and from the first signal transmission coil in a contactless manner, and a second case that is provided with the second power transmission coil and the second signal transmission coil and capable of being fitted to the first case, wherein
the first unit and the second unit have a positional relation such that the first power transmission coil and the second power transmission coil face each other along a first coupling axis direction, and the first signal transmission coil and the second signal transmission coil face each other along a second coupling axis direction different from the first coupling axis direction, in a state in which the first case and the second case are fitted to each other,
the first case has a fitting concave portion configured to receive the second case,
the first power transmission coil and the second power transmission coil face each other along the first coupling axis direction with a bottom portion of the fitting concave portion interposed therebetween,
the first signal transmission coil and the second signal transmission coil face each other along the second coupling axis direction with a side portion of the fitting concave portion interposed therebetween, and the second signal transmission coil is positioned inside with respect to the first signal transmission coil in the second coupling axis direction,
the first unit includes a first magnetic substance in the first case, the first magnetic substance being positioned on an opposite side to the first signal transmission coil with the first power transmission coil interposed therebetween in a fitting direction of the first case and the second case,
the second unit includes a second magnetic substance in the second case, the second magnetic substance being positioned between the second power transmission coil and the second signal transmission coil in the fitting direction,
the second magnetic substance is larger than the second power transmission coil in a direction orthogonal to the fitting direction, and
the second magnetic substance has an end portion in a direction orthogonal to the fitting direction, the end portion being bent toward the second power transmission coil in the fitting direction.

10. A power transmission communication unit comprising:
a first unit including a first power transmission coil capable of transmitting electric power in a contactless manner, a first signal transmission coil capable of transmitting a signal in a contactless manner, and a first case that is provided with the first power transmission coil and the first signal transmission coil; and
a second unit including a second power transmission coil capable of transmitting electric power to and from the first power transmission coil in a contactless manner, a second signal transmission coil capable of transmitting a signal to and from the first signal transmission coil in a contactless manner, and a second case that is provided with the second power transmission coil and the second signal transmission coil and capable of being fitted to the first case, wherein
the first unit and the second unit have a positional relation such that the first power transmission coil and the second power transmission coil face each other along a first coupling axis direction, and the first signal transmission coil and the second signal transmission coil face each other along a second coupling axis direction different from the first coupling axis direction, in a state in which the first case and the second case are fitted to each other, the first case has a fitting concave portion configured to receive the second case, the first power transmission coil and the second power transmission coil face each other along the first coupling axis direction with a bottom portion of the fitting concave portion interposed therebetween, the first signal transmission coil and the second signal transmission coil face each other along the second coupling axis direction with a side portion of the fitting concave portion interposed therebetween, and the second signal transmission coil is positioned inside with respect to the first signal transmission coil in the second coupling axis direction, the first unit includes a first magnetic substance in the first case, the first magnetic substance being positioned on an opposite side to the first signal transmission coil with the first power transmission coil interposed therebetween in a fitting direction of the first case and the second case, the second unit includes a second magnetic substance in the second case, the second magnetic substance being positioned between the second power transmission coil and the second signal transmission coil in the fitting direction, the second magnetic substance is larger than the second power transmission coil in a direction orthogonal to the fitting direction, the first unit includes a first metal shield member surrounding the first power transmission coil and the first magnetic substance in a direction orthogonal to the fitting direction, and the second unit includes a second metal shield member surrounding the second power transmission coil and the second magnetic substance in a direction orthogonal to the fitting direction.

* * * * *